(12) United States Patent
Witteveen

(10) Patent No.: US 7,105,987 B2
(45) Date of Patent: Sep. 12, 2006

(54) PIEZOELECTRIC MOTOR AND METHOD FOR ACTUATING SAME

(75) Inventor: Bonny Witteveen, Venlo (NL)

(73) Assignee: Miniswys S.A., Bienne (CH)

( * ) Notice: Subject to any disclaimer, the term of this patent is extended or adjusted under 35 U.S.C. 154(b) by 0 days.

(21) Appl. No.: 10/508,070

(22) PCT Filed: Mar. 12, 2003

(86) PCT No.: PCT/CH03/00162

§ 371 (c)(1),
(2), (4) Date: Oct. 19, 2004

(87) PCT Pub. No.: WO03/079462

PCT Pub. Date: Sep. 25, 2003

(65) Prior Publication Data

US 2005/0127784 A1 Jun. 16, 2005

(30) Foreign Application Priority Data

Mar. 15, 2002 (CH) .................................... 0452/02

(51) Int. Cl.
*H01L 41/04* (2006.01)
*H01L 41/08* (2006.01)

(52) U.S. Cl. ............ 310/328; 310/323.01; 310/323.02; 310/323.03; 310/323.08

(58) Field of Classification Search ................ 310/328, 310/323.01–323.04, 323.05, 323.08
See application file for complete search history.

(56) References Cited

U.S. PATENT DOCUMENTS

| | | | |
|---|---|---|---|
| 3,211,931 A * | 10/1965 | Tehon .......................... 310/333 |
| 4,453,103 A | 6/1984 | Vishnevsky et al. |
| 4,672,256 A * | 6/1987 | Okuno et al. .......... 310/323.07 |
| 4,814,660 A | 3/1989 | Yamada et al. |
| 4,831,306 A * | 5/1989 | Staufenberg et al. ....... 310/328 |
| 4,857,791 A * | 8/1989 | Uchino et al. .............. 310/321 |
| 4,884,002 A | 11/1989 | Eusemann ................... 310/323 |
| 4,959,580 A * | 9/1990 | Vishnevsky et al. ... 310/323.02 |
| 5,068,565 A * | 11/1991 | Huang ........................ 310/328 |
| 5,087,851 A | 2/1992 | Nakazawa et al. |
| 5,134,334 A | 7/1992 | Onishi et al. |
| 5,146,129 A | 9/1992 | Tamura et al. |
| 5,162,692 A | 11/1992 | Fujimura |

(Continued)

FOREIGN PATENT DOCUMENTS

EP 0 313 130 A2 4/1989

(Continued)

*Primary Examiner*—Darren E. Schuberg
*Assistant Examiner*—J. Aguirrechea
(74) *Attorney, Agent, or Firm*—Oppedahl & Olson LLP

(57) ABSTRACT

The piezoelectric motor (6) comprises a stator (1) and a runner (4) which form a gap (7) as well as comprising a piezoelectric transducer (3) which is connected to the stator (1) or the runner (4) and which with the stator (1) or the runner (4) forms a resonator (1,3;4,3), wherein the resonator (1,3; 4,3) may be excited in a main oscillation direction (H), characterised in that the stator (1) comprises an engagement surface (1*a*) facing the runner (4), or the runner (4) an engagement surface which faces the stator (1), and that the stator (1) or the runner (4) comprises an elastic advance element (5) which bridges the gap (7) between the stator (1) and the runner (4) in a manner such that the advance element (5) at least temporarily lies on the engagement surface (1*a*). The advance element (5) comprises a first part-section (5*c*) as well as a second part-section (5*d*), wherein the part-sections (5*c*, 5*d*) have a different resonant frequency.

23 Claims, 17 Drawing Sheets

U.S. PATENT DOCUMENTS

Figure 3A:
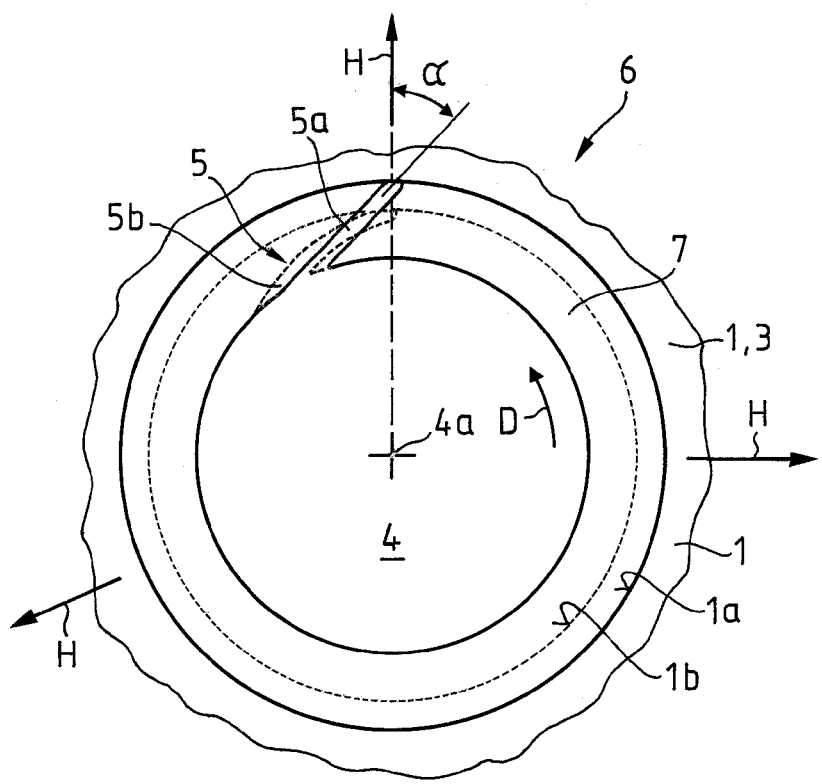

| | | |
|---|---|---|
| 5,191,688 A | 3/1993 | Takizawa et al. |
| 5,200,665 A | 4/1993 | Iijima |
| 5,216,313 A | 6/1993 | Ohinishi et al. |
| 5,296,776 A | 3/1994 | Wind et al. |
| 5,561,337 A | 10/1996 | Toda |
| 5,736,797 A * | 4/1998 | Motohashi et al. ............ 310/36 |
| 6,064,140 A | 5/2000 | Zumeris |
| 6,069,419 A * | 5/2000 | Tabib-Azar ............ 310/40 MM |
| 6,188,161 B1 | 2/2001 | Yoshida et al. |
| 6,201,339 B1 | 3/2001 | Tani et al. |
| 6,211,603 B1 * | 4/2001 | Iino et al. ............... 310/323.02 |
| 6,242,846 B1 | 6/2001 | Ashizawa et al. |
| 6,266,296 B1 | 7/2001 | Miyazawa |
| 6,323,578 B1 | 11/2001 | Suzuki et al. |
| 6,373,170 B1 * | 4/2002 | Hills ........................... 310/328 |
| 6,768,245 B1 * | 7/2004 | Mock et al. ............ 310/323.02 |
| 6,952,071 B1 * | 10/2005 | Bax ....................... 310/323.02 |

FOREIGN PATENT DOCUMENTS

| | | |
|---|---|---|
| EP | 1 075079 A1 | 2/2001 |
| JP | 61-240865 | 10/1986 |
| JP | 6-189569 | 7/1994 |
| JP | 11-52075 | 2/1999 |
| SU | 1 820 820 A1 | 2/1998 |
| WO | WO 92/10874 | 6/1992 |
| WO | WO 98/43306 | 10/1998 |
| WO | WO 01/41228 A1 | 6/2001 |
| WO | WO 02/13365 A1 | 2/2002 |
| WO | WO 02/099844 A2 | 12/2002 |
| WO | WO 03/036786 A2 | 5/2003 |

* cited by examiner

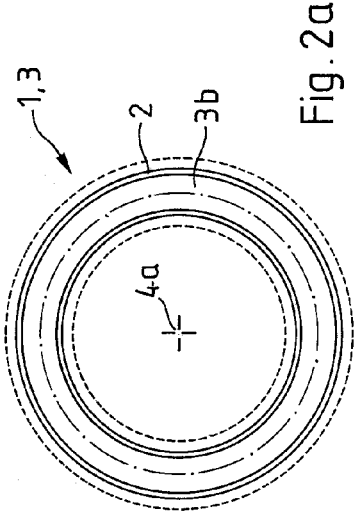
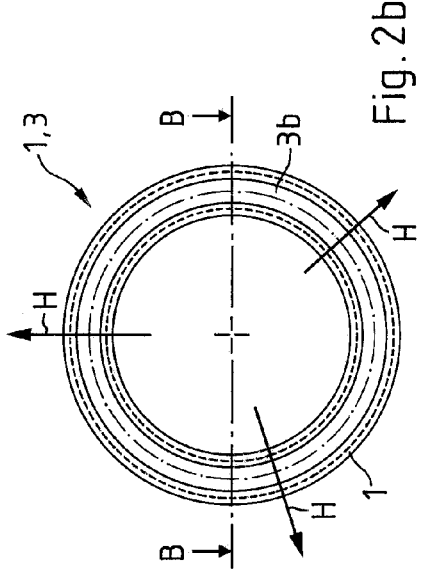
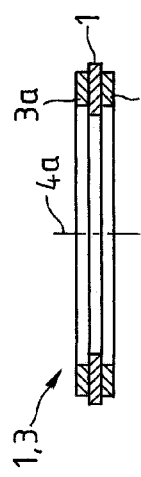
Fig. 2a
Fig. 2b
Fig. 2c (B-B)
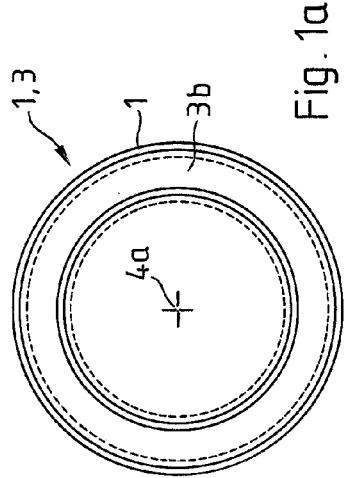
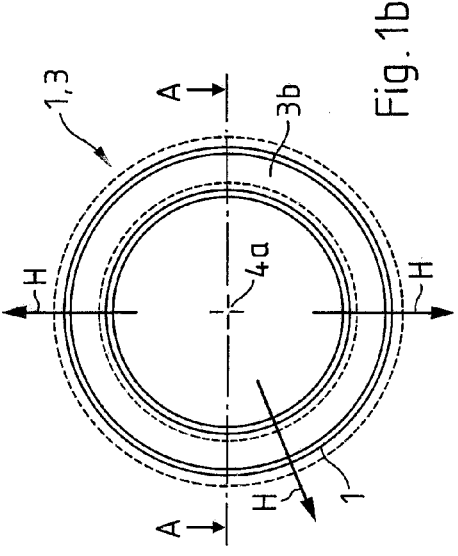
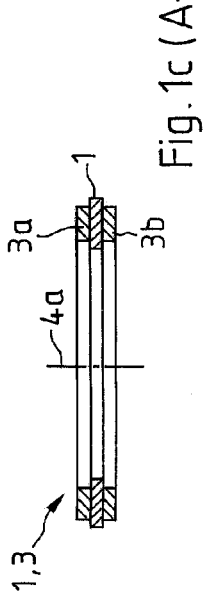
Fig. 1a
Fig. 1b
Fig. 1c (A-A)

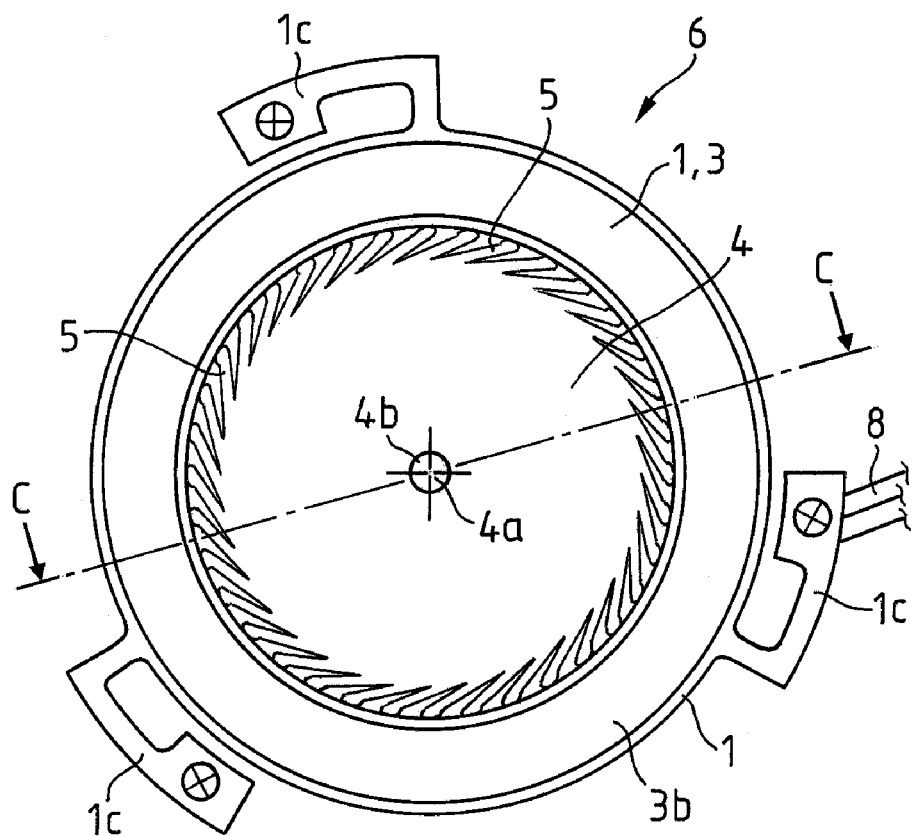
Fig. 9a
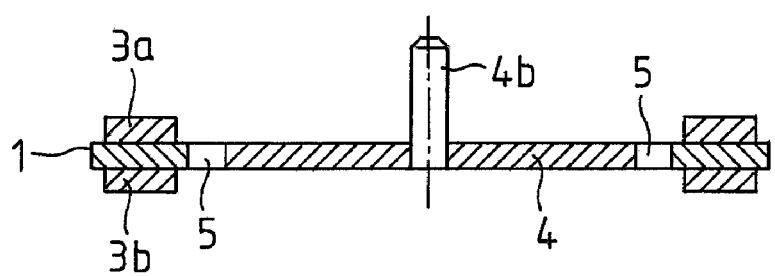
Fig. 9b (C-C)

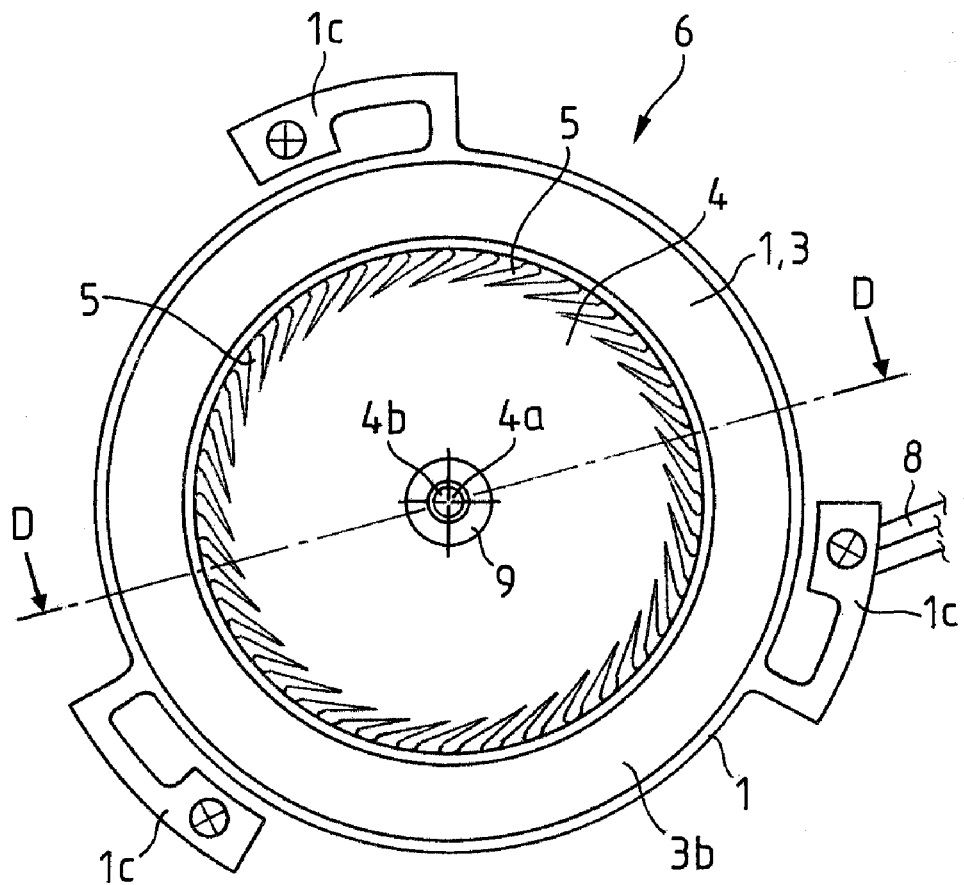
Fig. 10a
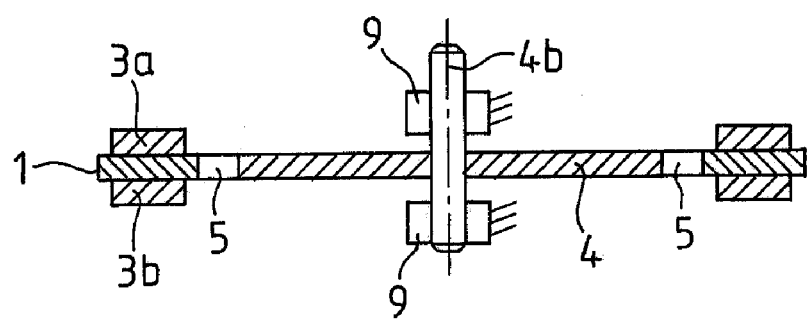
Fig. 10b (D-D)

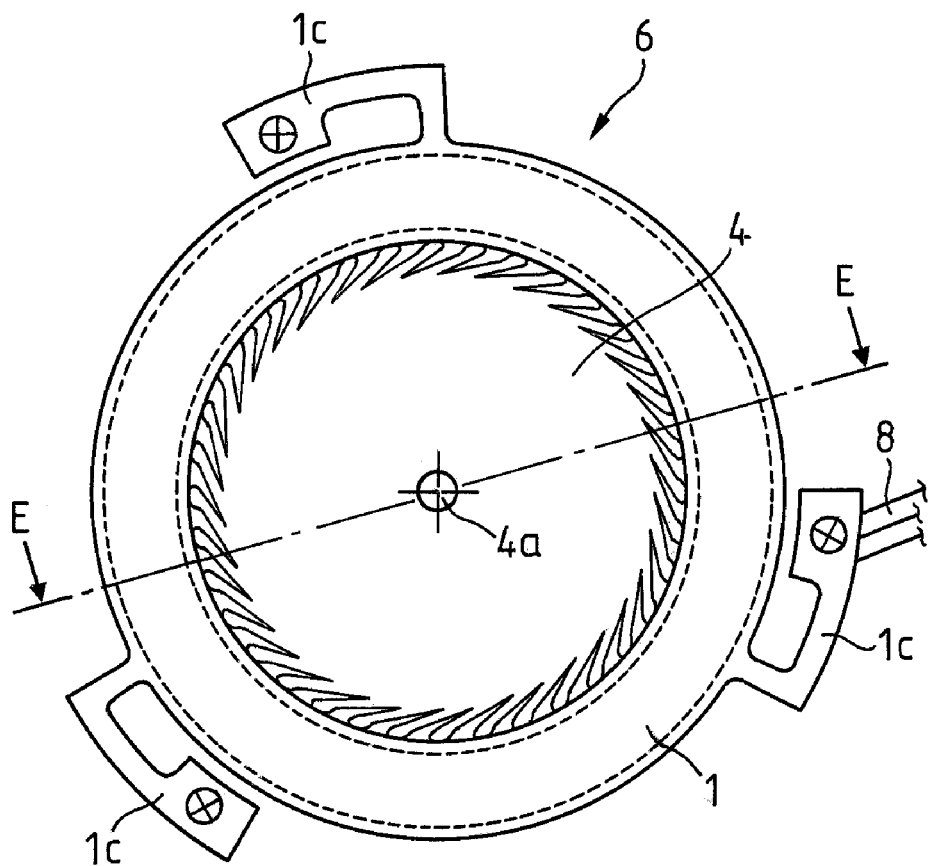
Fig. 11a
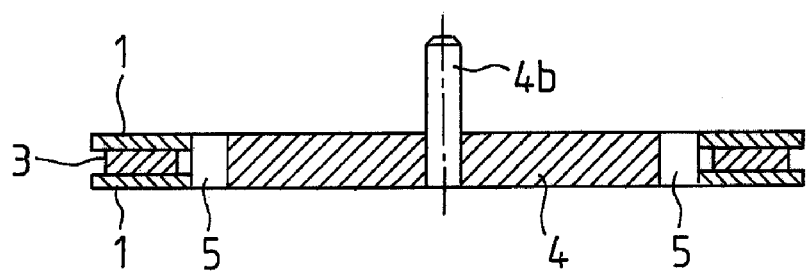
Fig. 11b (E-E)

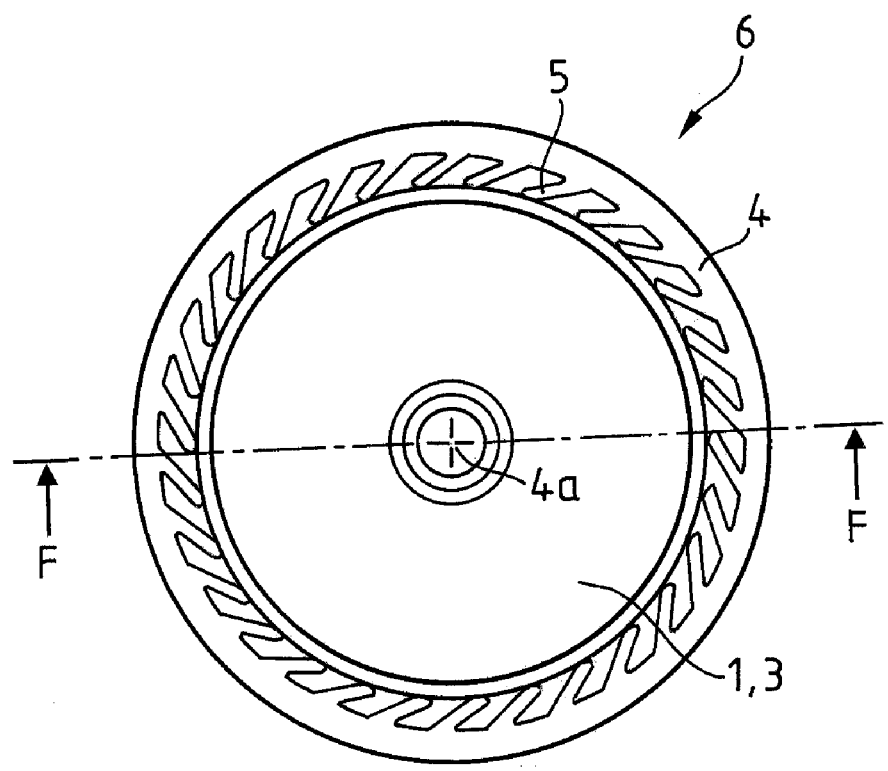
Fig. 12a
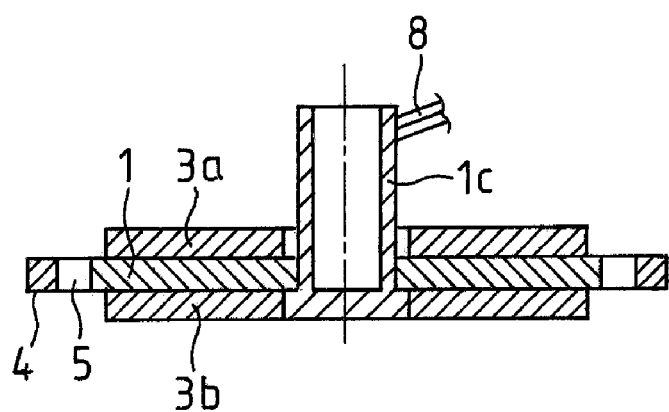
Fig. 12b (F-F)

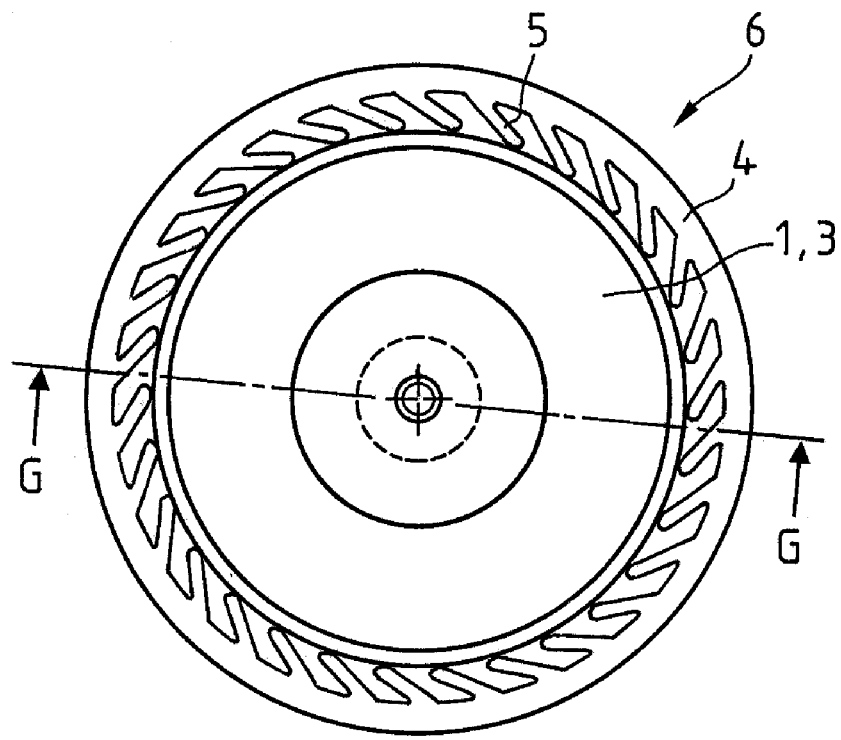
Fig. 13a
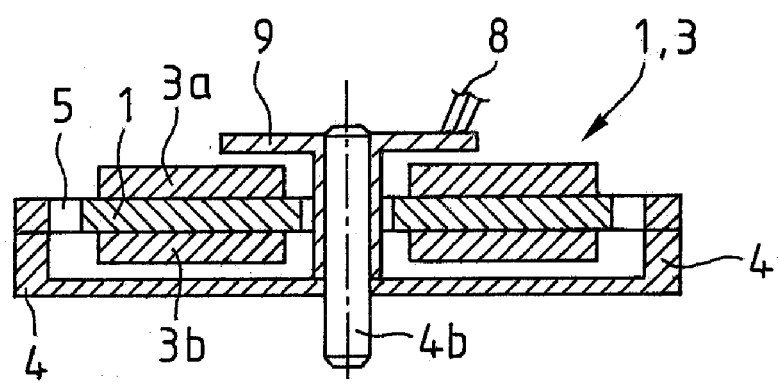
Fig. 13b (G-G)

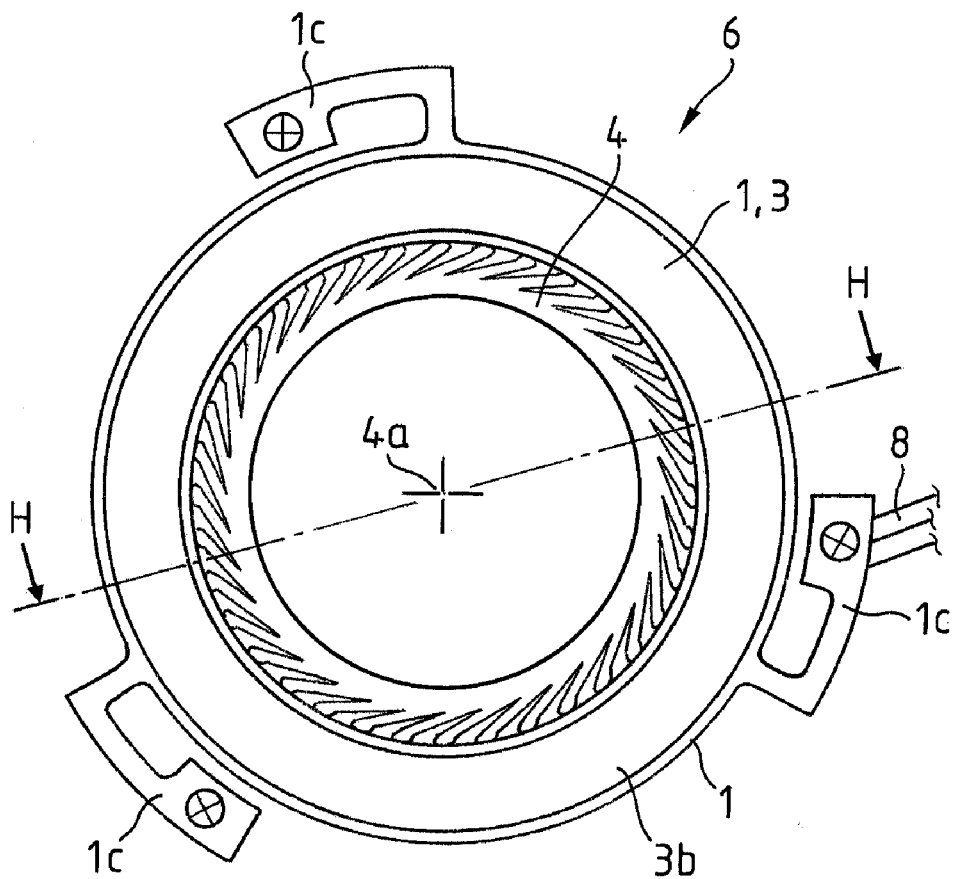
Fig. 14a
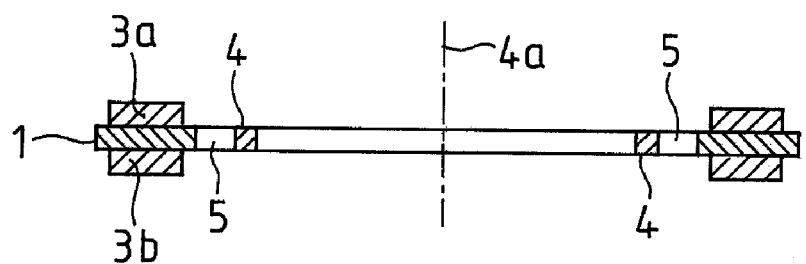
Fig. 14b (H-H)

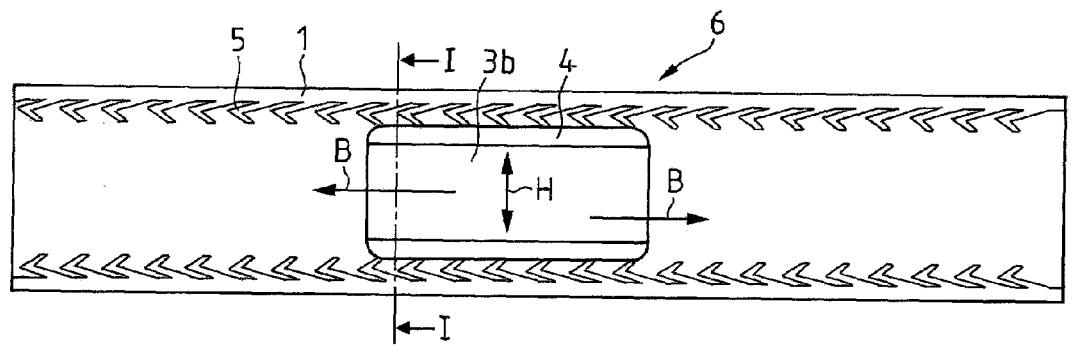
Fig. 15a
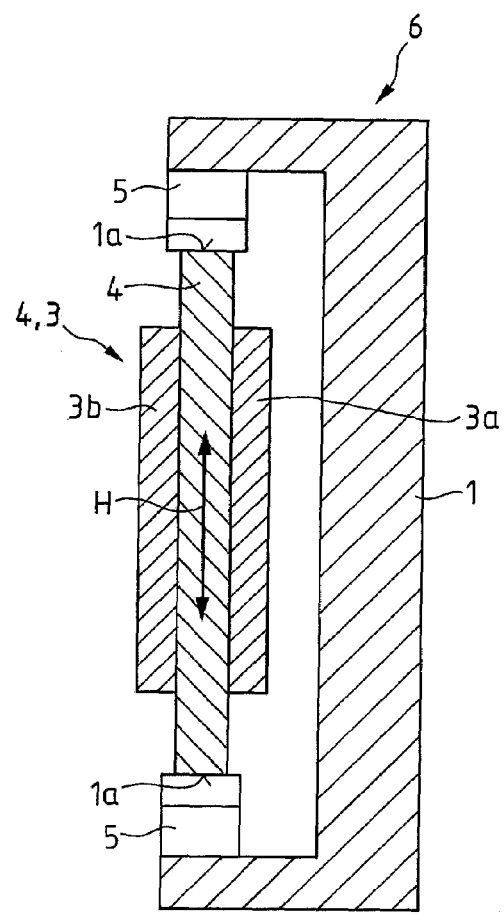
Fig. 15b (I-I)

PIEZOELECTRIC MOTOR AND METHOD FOR ACTUATING SAME

The invention relates to a piezoelectric motor according to the preamble of claim 1. The invention relates further to a method for driving a piezoelectric motor according to the preamble of claim 20.

A piezoelectric motor is known from the document EP 1 098 429 A2 which comprises at least two piezoelectric longitudinal actuators which are displaced by 90 degrees to one another and which act on a shaft via an annularly designed coupling element and by way of this set the shaft into rotation. For activating the individual longitudinal actuators, one requires sinusoidal voltage signals which need to have a constant phase relation of 90 degrees.

This piezoelectric motor has the disadvantages that several oscillation bodies are present which are to be matched to one another, that only small torques may be produced, that a large wear occurs between the coupling element and the shaft, and that the piezoelectric motor is relatively expensive.

It is the object of the present invention to provide a more advantageous piezoelectric motor. This object is achieved with a piezoelectric motor having the features of claim 1. The dependent claims 2 to 19 concern further advantageous formations. The object is achieved further with a method for driving a piezoelectric motor having the features of claim 20. The dependent claim 21 concerns a further advantageous formation of the method.

The object in particular is achieved by a piezoelectric motor comprising a stator and a runner which form a gap, wherein the stator or the runner is connected to a piezoelectric transducer which together with the stator or runner forms a resonator, wherein the resonator may be excited in a main oscillation direction, and wherein the stator comprises an engagement surface facing the runner or the runner an engagement surface facing the stator, and the stator or the runner comprises an elastic (flexible) advance element which runs at an angle to the main oscillation direction and which bridges the gap between the stator and the runner in a manner such that the advance element at least temporarily lies on the engagement surface. The resonator sets the advance element into an oscillating micro-movement so that the advance element periodically exerts an advance force onto the engagement surface, and the runner experiences an advance movement with respect to the stator, so that the runner is moved.

In a particularly advantageous formation, the piezoelectric motor is designed as a rotation motor, with a circular runner designed as a rotor, and a circular annular stator enclosing the rotor. The stator is equipped with one or two piezoelectric, annular transducers which together with the stator form a resonator. This resonator has a main oscillation direction running radially to the centre of rotation of the rotor, so that the resonator executes a micro-movement running in the radial direction. The advance element is connected to the stator or the rotor, is preferably designed running in an essentially straight line, and runs preferably at an angle larger than 0 degrees with respect to the main oscillation movement, in particular at an angle between 20 and 60 degrees. In one advantageous design a plurality to multitude of advance elements are arranged mutually uniformly distanced in the circumferential direction of the stator or of the rotor, wherein all advance elements lie on the same engagement surface. There results a piezoelectric motor which rotates clockwise or anticlockwise depending on the alignment of the advance element.

In a further advantageous design the advance element is not designed running in a straight line, but comprises a first part-section as well as a second part-section which meet at a sharp bend location. The first as well as the second part-section have a different resonant frequency (natural frequency) which has the result that the piezoelectric rotation motor executes a clockwise rotation or anticlockwise rotation depending on the frequency of the resonator. The two part-sections may oscillate freely on operation of the motor. The first part-section at the same time oscillates with respect to the stator or rotor connected to it, the second part-section oscillates with respect to the first part-section and acts on the engagement surface.

In a further, advantageous design the piezoelectric motor according to the invention is designed as a linear motor, wherein the stator extends in the linear direction, and the runner is movably mounted in this direction.

The piezoelectric motor according to the invention has the following advantages:

that it may be designed to rotate anticlockwise, clockwise or in both directions, that the maximum torque and the speed may be set via the engagement angle of the advance element with respect to the engagement surface, that the engagement surface is relatively large so that the advance element acting on the engagement surface has only a low wear as a result of this, that the advance element acts on the engagement surface without a hammering movement, which has the result of a low wear, that only a single resonator is required for operation, which in contrast to the known use of several resonators considerably simplifies the tuning of the mechanical resonance circuit, that the construction is very simple, that the manufacturing costs are relatively low, that it is very small and quiet, furthermore may be operated largely without any slip and has a fine resolution with respect to the rotation angle, that the shaft may be driven without any bending moment, that it may be operated at a low rotational speed, has a high torque and thus may be operated without transmission gears, that it has a short run-up time and stop time in the range of milliseconds, that it has a low constructional volume, that it emits almost no electromagnetic scatter field, and that it has a high efficiency.

Figure 3B:
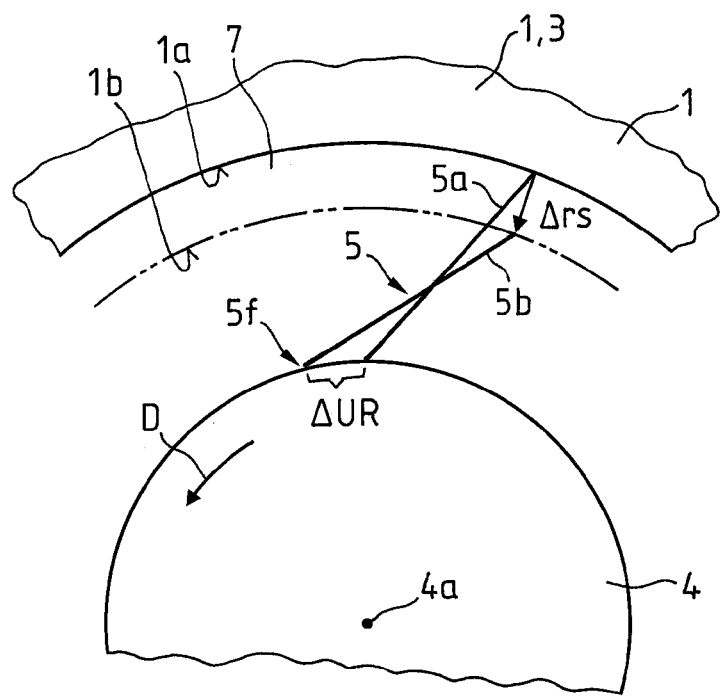
Figure 4:
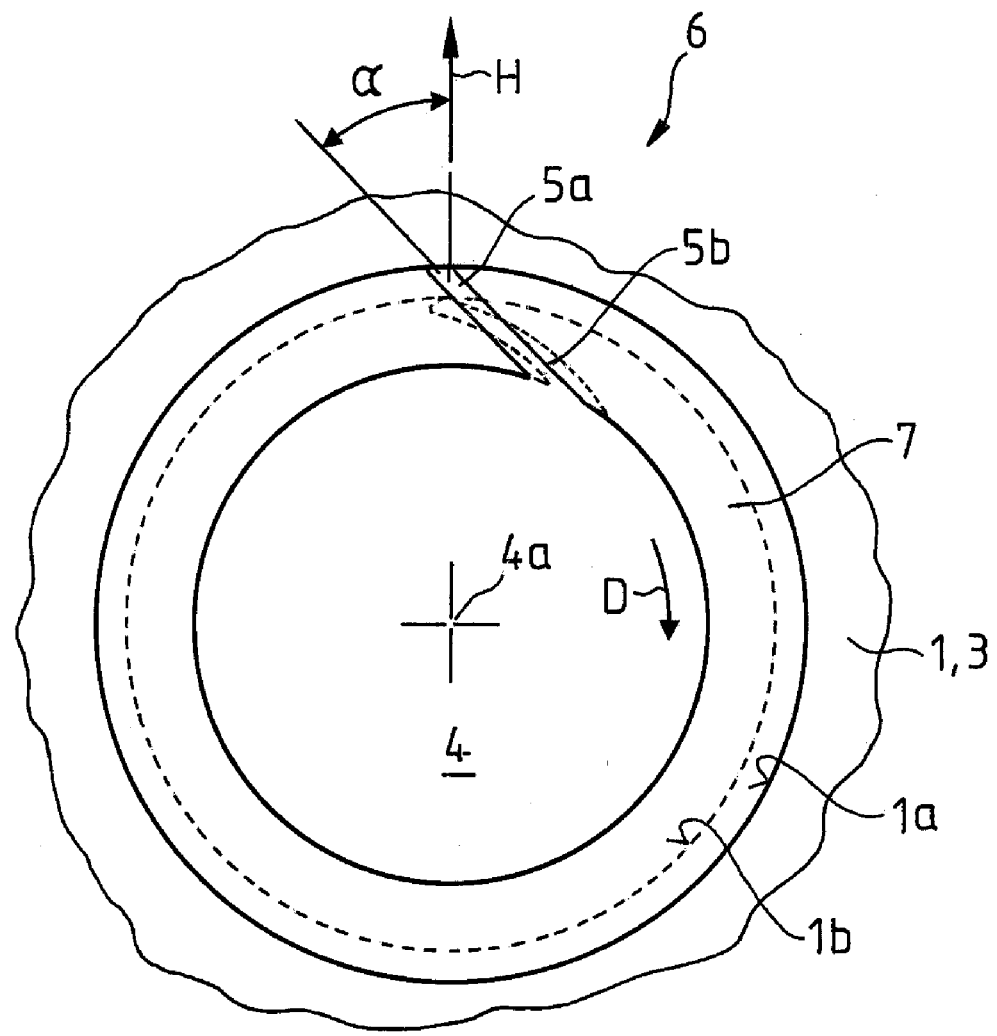
Figure 5A:
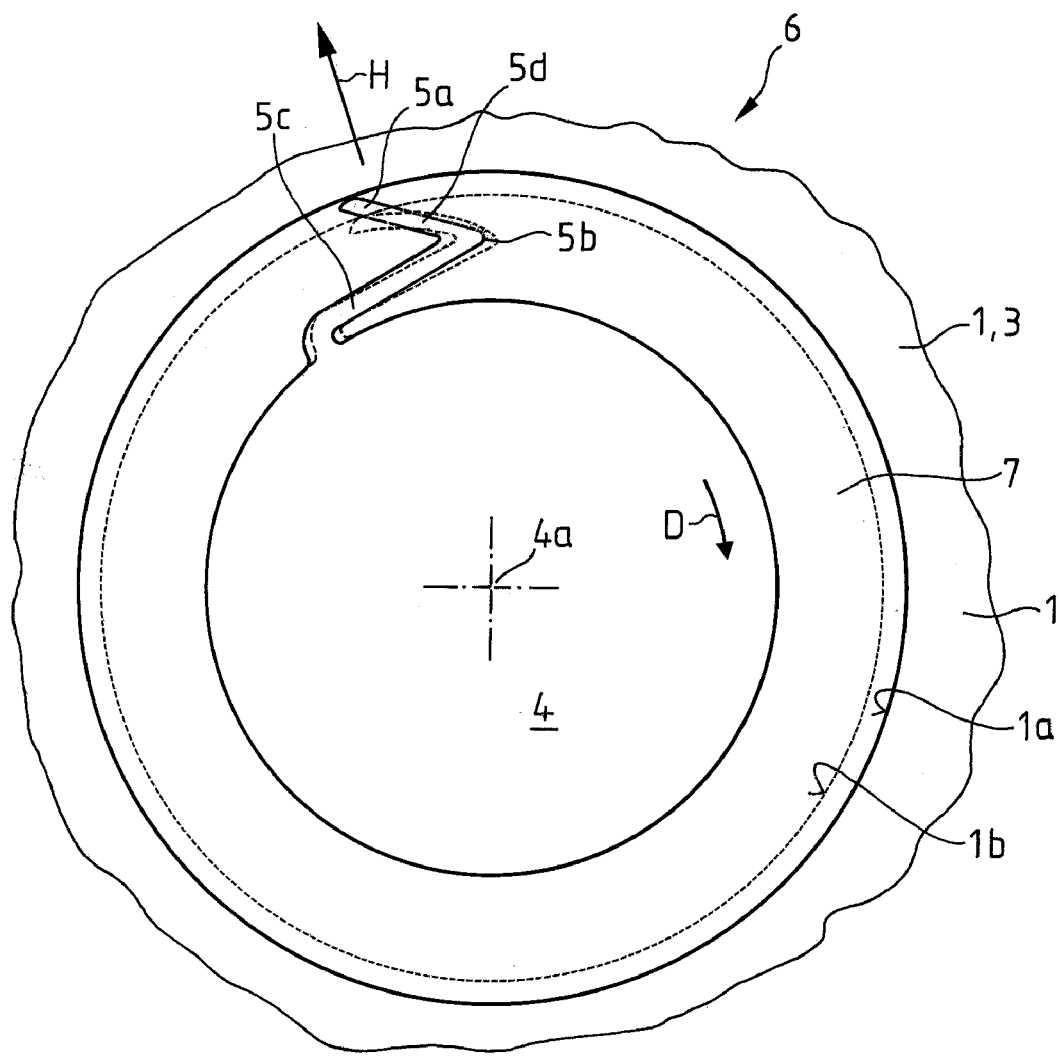
Figure 5B:
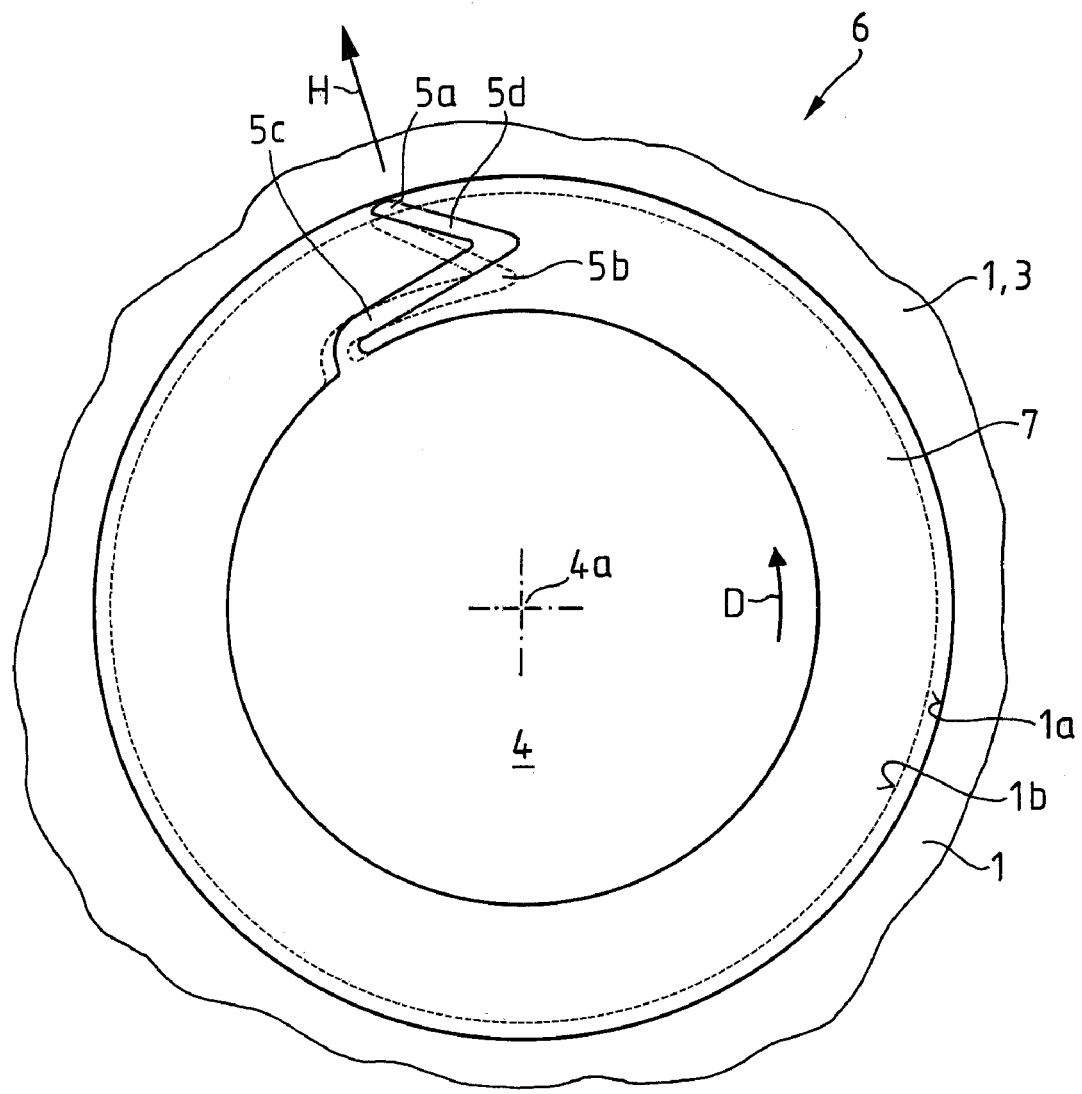
Figure 5C:
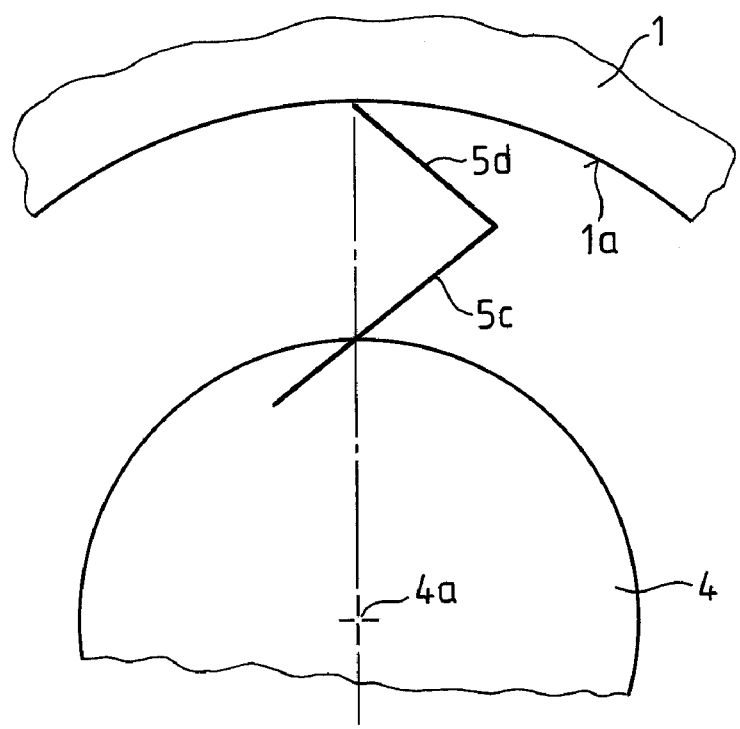
Figure 5D:
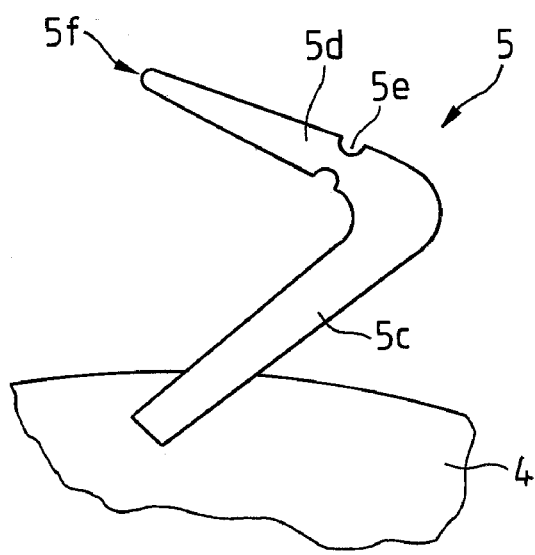
Figure 6:
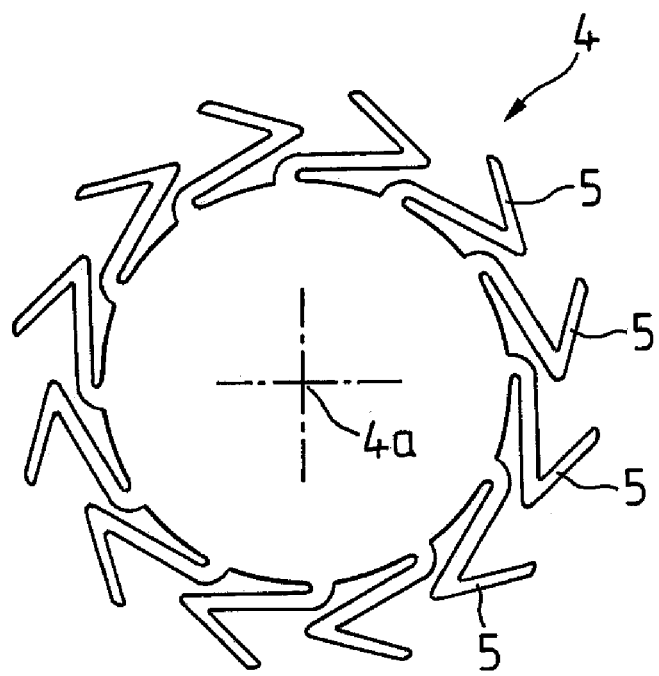
Figure 7:
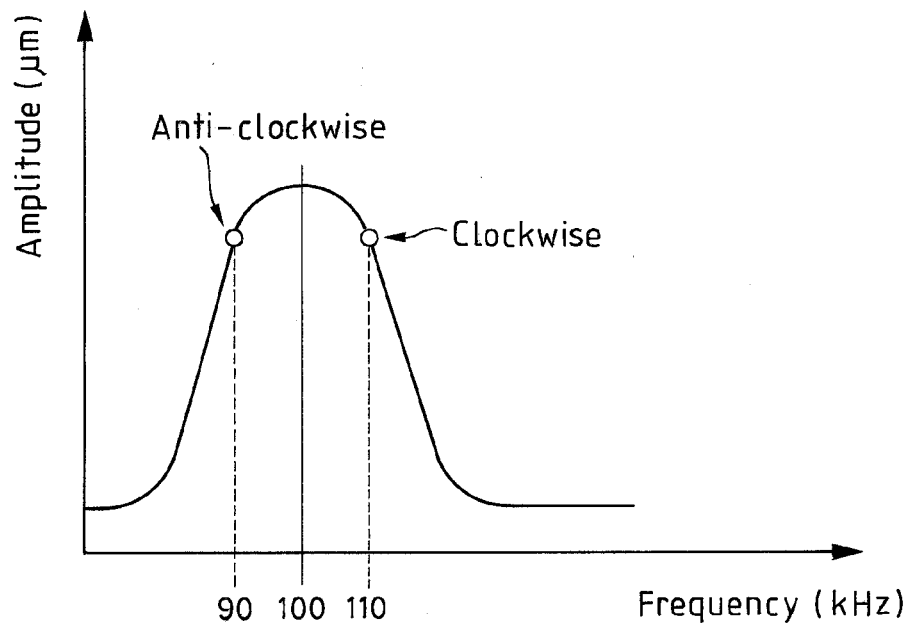
Figure 8:
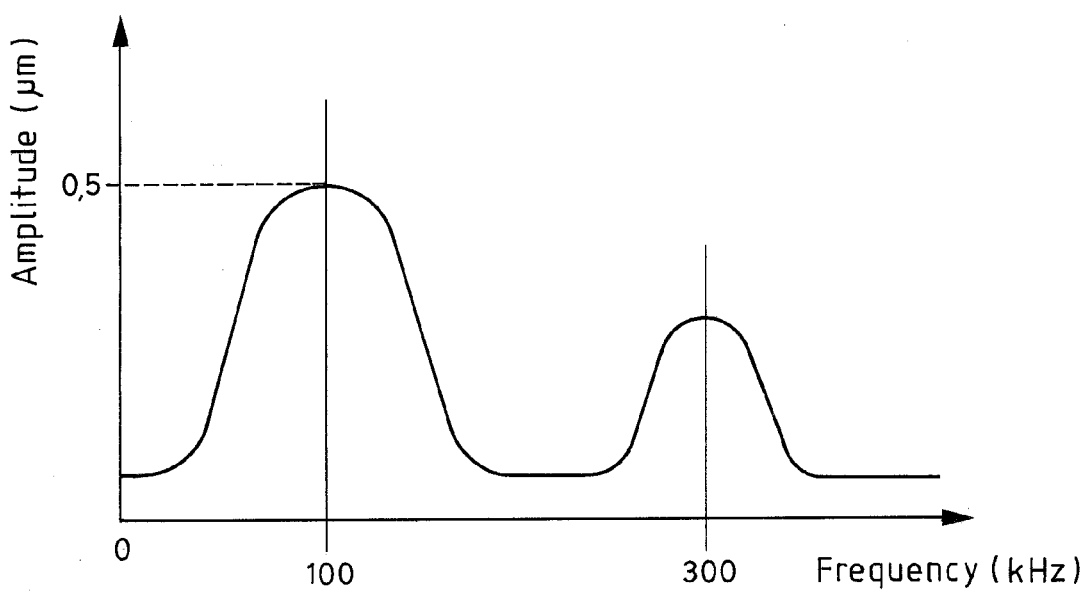
Figure 16A:
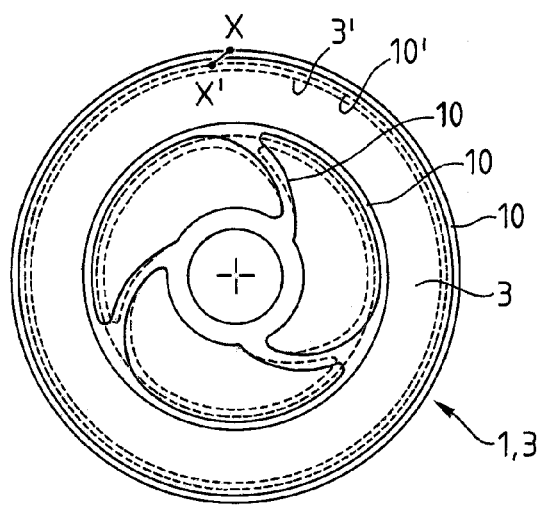
Figure 16B:
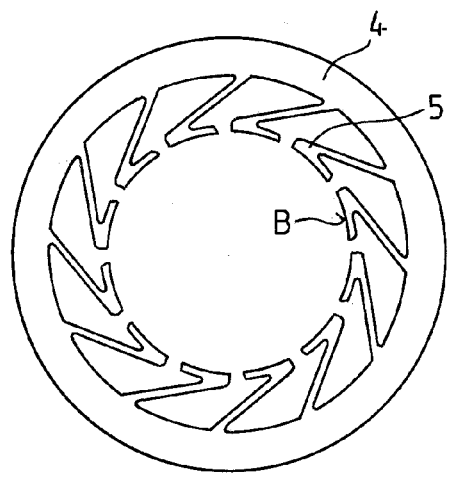
Figure 16C:
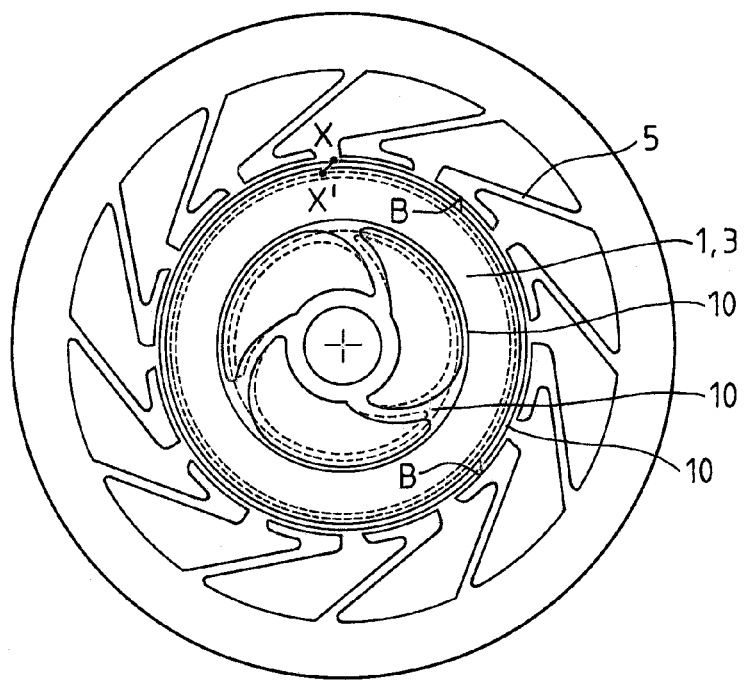
Figure 17A:
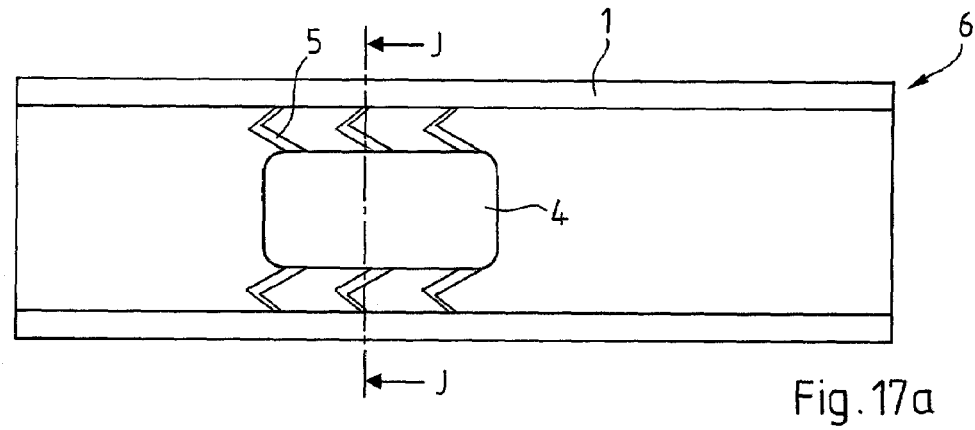
Figure 17B:
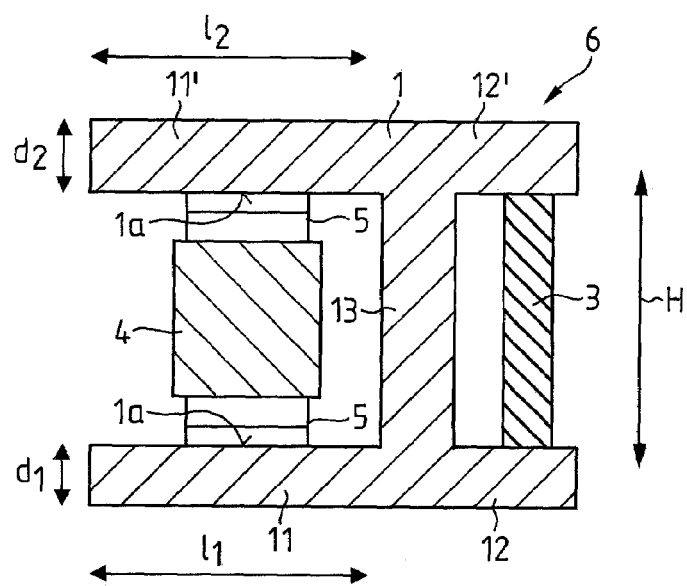
Figure 17C:
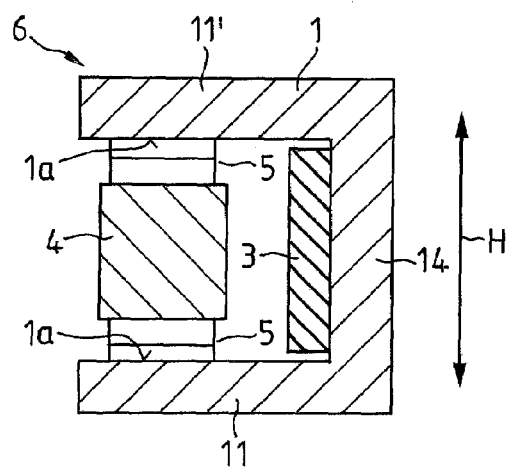
Figure 17D:
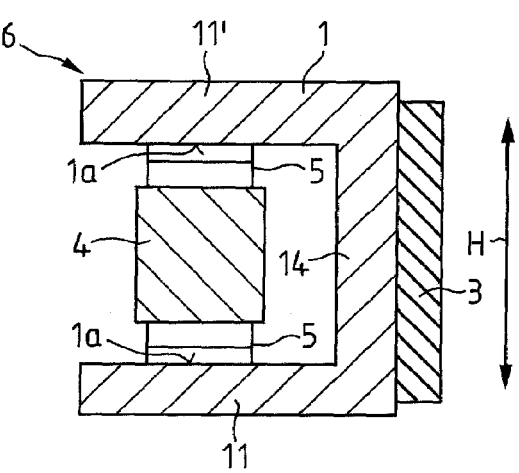

Several embodiment examples of the device according to the invention are hereinafter described in detail by way of the following figures. There are shown in:

FIG. 1a a lateral view of a radially oscillating stator as well as its contracted state;

FIG. 1b a lateral view of a radially oscillating stator as well as its expanded state;

FIG. 1c a section through the stator along the section line A—A;

FIG. 2a a lateral view of a further radially oscillating stator as well as its expanded state;

FIG. 2b a lateral view of a further radially oscillating stator as well as its contracted state;

FIG. 2c a section through the stator along the section line B—B;

FIG. 3a a lateral view of a rotor running in the anticlockwise direction;

FIG. 3b a schematic lateral view of a rotor running in the anticlockwise direction;

FIG. 4 a lateral view of a rotor running in the clockwise direction;

FIG. 5a a lateral view of a rotor running in the anticlockwise direction, which is capable of running in both rotation directions, FIG. 5b a lateral view of a rotor running in the clockwise direction, which is capable of running in both rotational directions, FIG. 5c a schematic view of the rotor with the advance element;

FIG. 5d a detailed view of a further advance element;

FIG. 6 a lateral view of a rotor which is capable of running in both rotation directions;

FIG. 7 the frequency behaviour of the stator and its resonance curve;

FIG. 8 the first and second resonance curve of the stator;

FIG. 9a a lateral view of a piezoelectric motor designed as an inner runner, without any mounting;

FIG. 9b a section through the motor represented in FIG. 9a, along the section line C—C;

FIG. 10a a lateral view of a further piezoelectric motor designed as an inner runner, with a mounting;

FIG. 10b a section through the motor represented in FIG. 10a, along the section line D—D;

FIG. 11a a lateral view of a further piezoelectric motor designed as an inner runner, without any mounting;

FIG. 11b a section through the motor represented in FIG. 11a, along the section line E—E;

FIG. 12a a lateral view of a piezoelectric motor designed as an outer runner, without a mounting;

FIG. 12b a section through the motor represented in FIG. 12a, along the section line F—F;

FIG. 13a a lateral view of a piezoelectric motor designed as an outer runner, with a mounting;

FIG. 13b a section through the motor represented in FIG. 13a, along the section line G—G;

FIG. 14a a lateral view of a piezoelectric motor designed as an inner runner, with a hollow runner;

FIG. 14b a section through the motor represented in FIG. 14a along the section line H—H;

FIG. 15a a lateral view of a linear motor for the anticlockwise and clockwise running;

FIG. 15b a section through the linear motor represented in FIG. 15a along the section line I—I;

FIGS. 16a, 16b, 16c a somewhat modified embodiment form of the motor;

FIG. 17a a lateral view of a further linear motor for anticlockwise and clockwise running; and FIGS. 17b, 17c, 17d in each case, various variants of a linear motor with a lateral view according to FIG. 17a, as a section along the section line J—J.

If hereinafter one speaks of a stator and runner or rotor, then these terms may be exchanged with one another, since the stationary part of the motor indicated as the stator may also be the runner or the rotating part of the motor if the part indicated as the runner or rotor is arranged in a stationary manner.

FIGS. 1a and 1b show a resonator 1,3 consisting of a circular annular stator of metal or ceramics as well as of two annular piezoelectric transducers 3a, 3b which are arranged on the stator 1 on both sides and are firmly connected to this. The resonator 1,3 is designed in an axially symmetrical manner with respect to the centre 4a and in the excited condition has a main oscillation direction H or micromovement running in the radial direction with respect to the centre 4a. At the same time the resonator 1,3 is designed in a manner such that this in its entirety contracts, as this is indicted in FIG. 1a by the outline shown dashed, or that this in its entirety expands, as this is indicated in FIG. 1b by the outline shown dashed.

FIG. 1c shows a section through the resonator 1,3 along the section line A—A.

FIG. 2a and FIG. 2b show a further resonator 1,3 which in contrast to the embodiment shown in the FIGS. 1a, 1b may be excited in a main oscillation direction H running radially with respect to the centre 4a, in a manner such that the annulus width of the resonator 1,3 increases as this is indicated in FIG. 2a by the outline shown dashed, or that the annulus width of the resonator 1,3 is reduced as this is indicated in FIG. 2b by the outline shown dashed.

FIG. 2c shows a section through the resonator 1,3 along the section line B—B.

FIG. 3a shows a detail of a piezoelectric motor 6 which comprises a resonator 1,3 as this is disclosed in the FIGS. 1a, 1b, 2a, and 2b. The resonator 1,3 comprises an inwardly directed engagement surface 1a. The resonator 1,3 may be excited in the main oscillation direction H so that the engagement surface 1a oscillates in this direction. The engagement surface 1b represented dashed shows the position of the engagement surface 1a at the point in time of the maximum contraction of the resonator 1,3. A circular rotor 4 with a rotation centre 4a is arranged within the stator 1 whilst forming a gap 7. An elastic advance element 5 is arranged on the surface of the rotor at an angle a to the main oscillation direction H. In an initial position the engagement surface has the position indicated at 1a, and the advance element 5 the position indicated at 5a. The advance element 5 bends during the movement of the engagement surface 1a to the position indicated at 1b and moves into the thrust position indicated at 5b. Since the friction force between the engagement surface 1a and the advance element 5 is sufficiently large, the advance element 5 remains supported on the same position of the engagement surface 1a, 1b during the contraction of the engagement surface from the position 1a to the position 1b which is why the advance element 5 effects a force on the rotor 4 directed to the left so that the rotor 4 undergoes an anticlockwise rotation in the direction D. With the forward swing movement of the engagement surface from the position 1b to the position 1a the resonator 1,3 undergoes a high acceleration. The friction force of the advance element 5 on the engagement surface 1a, 1b is very small on account of this so that during the forward swing movement no or only a small force acting in the rotation direction D is exerted on the rotor 4 so that this undergoes essentially no movement. By way of the subsequent contraction of the resonator 1,3, the rotor 4 is however rotated again in the direction D via the advance element 5. As long as the resonator 1,3 oscillates in the main oscillation direction, the rotor 4 thus executes an anticlockwise rotation in the direction D. The rotor 4 no longer executes a rotational direction as soon as the resonator 1,3 comes to rest. The piezoelectric motor 6 may thus be started and stopped again in an infinite manner.

FIG. 3b in detail once again shows the manner of functioning of the piezoelectric motor 6 represented in FIG. 3a. The resonator 1,3 with the engagement surface 1a is contracted in the radial direction about the distance $\Delta rs$ so that the engagement surface assumes the position indicated at 1b. At the same time the advance element is moved from the initial position 5a into the thrust position 5b, and the tip 5f of the advance element 5 is displaced in the rotational direction by the amount $\Delta UR$ so that the tip 5f lying on the rotor 4 rotates the rotor 4 by this amount.

FIG. 4 shows a modified embodiment of the piezoelectric motor 6 shown in FIG. 3a in which the advance element 5, in comparison to the embodiment according to FIG. 3a, is arranged running in the opposite direction with respect to the main oscillation direction H. This has the result that the rotor 4 undergoes a rotation in the direction D during the oscillation of the resonator 1,3 and thus executes a clockwise rotation. With the exception of the arrangement of the advance element 5, the piezoelectric motors 6 represented in FIG. 3a and FIG. 4 are designed identically.

FIGS. 5a and 5b show a piezoelectric motor 6 which in contrast to the embodiment represented in FIG. 4 comprises an advance element running with a sharp bend. The advance element 5 comprises a first part-section 5c connected to the rotor 4, as well as a part-section 5d which connects thereto and which runs in the opposite direction with respect to the main oscillation direction H.

FIG. 5c in a schematic and detailed manner shows the advance element 5 represented in the FIGS. 5a and 5b.

FIG. 5d shows an embodiment of an advance element 5 running with a sharp bend with a first part-section 5c, a narrowing location 5e which runs into the second part-section 5d, and with a tip 5f in which the second part-section 5d ends. The advance element 5 is rigidly connected to the runner or rotor 4. The narrowing location 5e is not absolutely necessary, it may be arranged in an arbitrary manner in order to influence the characteristic oscillation of the part-sections.

The advance element 5 running with a sharp bend has a technical particularity which hereinafter will be described in more detail. The first part-section 5c has a first natural resonant frequency f1. The second part-section 5d has a second natural resonant frequency f2. The two part-sections 5c, 5d are designed and are mutually mechanically coupled, in a manner such that the two natural resonant frequencies f1, f2 have different values. The entire advance element 5 is excited into oscillation via the resonator 1,3, and with this oscillates at a frequency f.

FIG. 6 shows an embodiment example of a rotor 4 on whose surface a plurality of sharply bent advance elements 5 are arranged in distanced manner. In a preferred design, the piezoelectric motor 6 represented in the FIGS. 5a, 5b comprises the rotor 4 shown in FIG. 6.

FIG. 7 shows the oscillation amplitude of the advance element 5 as a function of the exciting frequency f. The advance element 5 here for example has a resonator frequency in the range of 100 kHz.

FIG. 8 shows the oscillation amplitude of the resonator 1,3 as a function of the exciting frequency f, as this was used for the piezoelectric motor 6 shown in the FIGS. 5a and 5b. The resonator 1,3 has a natural frequency with the frequencies 100 kHz and 300 kHz by way of example.

A comparison of FIGS. 7 and 8 shows that the piezoelectric motor 6 represented in the FIGS. 5a and 5b is designed in a manner such that the resonator 1,3 as well as the advance element 5 have a resonance in the region of 100 kHz. The subsequently described technical effect is of particular interest. The advance element 5 is designed in a manner such that below the resonant frequency of 100 kHz, as shown for example at 90 kHz, essentially the first part-section 5c has a resonance behaviour with a correspondingly high amplitude. This resonance behaviour is shown in FIG. 5b in that the first part-section 5c is deflected relatively heavily, whereas the second part-section 5d which is excited outside its resonant frequency only undergoes a slight deflection or shape change. This has the consequence that the rotor 4 is rotated in the anti-clockwise direction in the rotational direction D.

The advance element 5 is furthermore designed such that above the resonant frequency of 100 kHz, for example at 110 kHz as shown, essentially the second part-section 5c has a resonance behaviour with a correspondingly high amplitude. This resonance behaviour is shown in FIG. 5a in which the second part-section 5d is deflected relatively heavily whereas the first part-section 5c which is excited outside its resonance frequency only undergoes a small deflection or shape change. This has the result that the rotor 4 is rotated clockwise in the rotation direction D. Thus the piezoelectric motor 6 represented in the FIGS. 5a and 5b, as shown in FIG. 7, rotates anti-clockwise or clockwise depending on the excitation frequency. This design of the piezoelectric motor according to the invention thus has the advantage that it may be driven in both rotational directions, that the rotational direction may be selected and that the rotational direction for example may also be constantly changed during operation.

FIG. 9a shows a lateral view of a piezoelectric motor 6 designed as an inner runner, with a resonator 1,3, a stator with fastening means 1c, with an annular piezoelectric transducer 3a, 3b with electrical supply leads 8, as well as a rotor with a multitude of advance elements 5 arranged distanced from one another in the circumferential direction, which may be rotated about the rotation centre 4a.

FIG. 9b shows a section through FIG. 9a along the section line C—C, from which the resonator 1,3 with the stator 1 and the piezoelectric transducer 3a, 3b as well as the rotor 4 with the advance element 5 and a shaft 4b arranged in the centre may be seen.

FIG. 10a shows a lateral view of a further piezoelectric motor 6 whose shaft 4b in contrast to the embodiment shown in FIG. 9a is mounted in a bearing 9.

FIG. 10b shows a section through FIG. 10a along the section line D—D, from which the resonator 1,3 with the stator 1 and the piezoelectric transducer 3a, 3b as well as the rotor with the advance element 5 and a shaft 4b arranged in the centre may be seen, which is mounted in the bearing 9.

FIG. 11a shows a lateral view of a further piezoelectric motor whose resonator 1,3 in contrast to the embodiment shown in FIG. 9a comprises two stators 1 and a piezoelectric transducer 3 arranged there between.

FIG. 11b shows a section through FIG. 11a along the section line E—E, from which the resonator 1,3 with the two stators 1 and the piezoelectric transducer 3 arranged therebetween as well as the rotor 4 with the advance element 5 and a shaft 4b arranged in the centre may be seen.

FIG. 12a shows a lateral view of a piezoelectric motor 6 designed as an outer runner, with a resonator 1,3, a stator 1 which is firmly anchored via the fastening element 1c, two disk-like piezoelectric transducers 3a, 3b with electrical supply leads 8, as well as a rotor 4 with a multitude of advance elements 5 arranged distanced in the circumferential direction, said rotor being designed as a hollow runner and being rotatable about the rotation centre 4a. The advance elements 5 are arranged projecting inwards and lie on the circular outer surface of the resonator 1,3.

FIG. 12b shows a section through FIG. 12a along the section line F—F, from which the resonator 1,3 with the stator 1, piezoelectric transducers 3a, 3b and the fastening element 1c with electrical conduits 8 may be seen. The rotor 4 with the advance elements 5 is designed as an outer runner and lies on the outer surface of the resonator 1,3.

FIG. 13a shows a lateral view of a further piezoelectric motor 6 designed as an outer runner. In contrast to the embodiment represented in the FIGS. 12a and 12b, the stator 1 with the piezoelectric transducers 3a, 3b as well as the rotor 4 are mounted in a common bearing 9 with a shaft 4b.

FIG. 13b shows a section through FIG. 13a along the section line G—G, from which the resonator 1,3 fastened on the bearing 9, with the stator 1 and piezoelectric transducers 3a, 3b as well as the rotor 4 with advance elements, which is mounted on the shaft 4b are visible. The shaft 4b is rigidly connected to the bearing 9.

FIG. 14a shows a lateral view of a further piezoelectric motor 6 whose rotor 4, in contrast to the embodiment shown in FIG. 9a, is designed as a hollow runner 4.

FIG. 14b shows a section through the motor shown in FIG. 14a along the section line H—H, from which the resonator 1,3 as well as the rotor 4 designed as a hollow runner may be seen.

FIG. 15a schematically show the principle of how one may design the piezoelectric motor 6 according to the invention as a linear motor. The electrical connections for exciting the piezoelectric element, or with sandwich designs the piezoelectric elements, are not shown.

FIG. 15b in a schematic representation shows a section through the linear motor according to 15a along the section line I—I. The runner 4 is designed in a rectangular and plate-like manner. In each case one piezoelectric transducer 3a, 3b is arranged on the runner 4 on both sides, wherein the runner 4 and the transducers 3a, 3b form a resonator 4,3 which has a main oscillation direction H. The runner 4 is displaceably mounted in the stator 1 in a movement direction running perpendicular to the main oscillation direction H, and at the top and bottom in each case has an engagement surface 1a. The stator 1 comprises a multitude of advance elements 5 which are arranged projecting towards the runner 4 and are arranged distanced in the movement direction B. The advance elements 5, as shown in detail in the FIGS. 5a to 5d are designed with shape having a sharp bend and have the resonance behaviour represented in FIG. 7. This has the result that the runner 4 is moved to the left or right in the linear motor 6 shown in FIG. 15a, depending on the excitation frequency of the resonator 4,3.

In the previously represented embodiment examples, the piezoelectric transducer 3 may be arranged on the runner 4, analogously to the embodiment examples shown in the FIGS. 15a and 15b.

FIG. 17a schematically shows a preferred embodiment of the invention as a linear motor 6. The runner 4 thus comprises the advance elements 5, and the stator 1 comprises at least one piezoelectric transducer 3. The remaining features, if not stated otherwise, are designed analogously to those of the embodiment according to FIG. 15.

FIG. 17b schematically shows a section through a linear motor 6 according to FIG. 17a along the section line J—J. The stator 1 preferably comprises an H-shaped cross section with a first arm pair 11, 11' and with a second arm pair 12, 12'. The first arm pair 11, 11' forms a channel in which the runner 4 may be moved. The engagement surfaces 1a are located on the inner side of the first arm pair 11, 11' and are distanced from a connection part 13 of the H-profile. The second arm pair 12, 12' forms a further channel in which the at least one piezoelectric transducer 3 is arranged. Its main oscillation direction H runs perpendicularly to the movement direction of the runner 4 or to a main extension of the stator. If several piezoelectric transducers are present, they are distanced from one another in this main extension direction. On operation of the linear motor 6 the oscillations of the at least one transducer 3 are transmitted to the second arm pair 12, 12' and from this to the first arm pair 11, 11' by way of a lever effect. For this, the stator has a certain flexibility which permits an oscillation of the arm pair 11, 11', 12, 12' with respect to the connection part 13 of the H-profile.

FIGS. 17c and 17d in each case schematically show a section through the linear motor 6 with the view according to FIG. 17a, but with a U-shaped cross section. One or more transducers 3 are connected to a base part 14 of the U-profile or attached on a base part on an inner side (FIG. 17c) or outer side (FIG. 17d) of this base part. The transducer or transducers 3 extend preferably in the main oscillation direction H partly or at least approximately completely over the base part 14. The resonator 3,4 has two stable resonant frequencies. On exciting the piezoelement 3 at a first resonant frequency, for example at 20 kHz, a bending and an oscillation, above all of the base 14 of the U-profile together with the arm pairs 11, 11' results. At a second resonant frequency, for example at 30 kHz, the base 14 remains relatively flat and above all only the arm pair 11, 11' oscillates. These two resonant frequencies are matched to the resonant frequencies of the advance elements 5 of the runner 4 and thus effect a left-running or right-running of the runner 4. In this embodiment form as in all others, the excitation or resonant frequencies are preferably outside the range of human audibility, preferably higher than 16 kHz or 20 kHz.

An extension of the stator in the plane of the drawing and perpendicular to the main oscillation direction H preferably lies in a range between 1 mm to 3 mm or 30 mm, and a width of the runner 4, thus a distance of the engagement surfaces 1a lies preferably in a range between 1 mm to 3 mm or 20 mm. Cross sectional areas below 1 $mm^2$ and extensions of several centimetres may be realised.

In a preferred embodiment of the invention, with one or both of the arm pairs 11, 11', 12, 12' in each case one of the arms has a different natural frequency than the other. For example a first arm 11 of the first arm pair in the main oscillation direction has a thickness $d_1$ which differs from a thickness $d_2$ of a second arm 11' of the first arm pair. As an alternative to this or additionally, the first arm 11 of the first arm pair has a lever arm $1_1$ which is different to a lever arm $1_2$ of the second arm 11' of the first arm pair. Amongst other things, this has the advantage that one does not need to fulfil high demands with respect the tolerance of the dimensions of the arms 11, 11'.

For increasing the friction value or for improving the frictional connection between the engagement surface 1a and the advance element 5, the corresponding surfaces for example on the advance element 5 may be enlarged (grinding, bending or by integrally shaped extensions). They may have a defined surface roughness, a micro-toothing or consist of a suitable pairing of material.

FIGS. 16a, 16b and 16c show a somewhat modified spatial formation of the piezomotor according to the invention, in each case in a plan view. For an improved understanding, the rotor, here as an outer runner, and the stator, here as a resonator, are shown individually and both assembled.

A piezoceramic ring 3, combined with a metal plate 10 designed according to FIG. 16a is brought to oscillate by way of an alternating voltage in a manner such that a radial contraction and an extension again occur. With a suitable choice of geometry the piezoceramic ring 3 and the metal plate begin to execute a torsion oscillation to the centre+ where for example a fixation is arranged. By way of these two oscillations, the radial one of the piezo-ring and the rotative one of the torsion, when superimposed, a point X on the outer side of the metal plate describes a curved path to the point X' on the dashed line 10' on the periphery of the deflected metal plate and back again. The second dashed line 3' shows the deflection of the piezoelement. By way of this superimposed deflection, any part which contacts the outer side of the ring, for example an outer runner with advance elements, is set into motion. The construction may be designed as a sandwich between two piezoceramic rings or with only one piezoceramic ring as has already been discussed several times in the previous figures.

An outer runner designed according to FIG. 16b with an annularly arranged number of advance elements 5, see also FIG. 12a with a similar shape, is designed in a manner such that the advance elements 5 do not necessarily, but here for example have an enlarged contact surface B to the torsionally oscillating resonator (not to be confused with, the advance element with various part regions with various natural frequencies, which practically contact the part to be driven only at the tip). With the assembly of the stator 1,3 and the outer runner 4, as shown in FIG. 16c, one recognises the principle of this drive with superimposed oscillation.

Regarding operation of the motor: The piezoelectric motor 6 according to the invention comprises a stator 1 as well as the runner, wherein the stator 1 or the runner 4 may be piezoelectrically excited into an oscillation with a main oscillation direction H, is preferably operated in a manner such that the stator 1 comprises an engagement surface facing the runner 4 or the runner 4 comprises an engagement surface 1a facing the stator 1, that the stator 1 or the runner 4 comprises an advance element 5 which runs transversely to the main oscillation direction H and is directed towards the engagement surface 1a, and that the advance element 5 on account of the oscillation may be brought into active connection with the engagement surface 1a in a manner such that the runner 4 is moved with respect to the stator 1.

In a further method for operating the motor, one proceeds in that the advance element comprises a first part-section 5c as well as a second part-section 5d, that the first part-section 5c runs at an angle to the main oscillation direction H, that the second part-section 5d runs at an angle to the main oscillation direction H and opposite to the first part-section 5c, that the first and the second part-section 5c, 5d have a different resonant frequency, and that the runner 4 is moved in the one direction or in the direction opposite to this with respect to the stator 1, depending on the frequency of the engaging oscillation of the runner 4.

The embodiment forms presented here may be divided roughly into two groups according to which part is designed as a resonator. With the one group the part on which the advance element or elements is/are arranged is formed as a resonator so that the resonator is supported in a spring-mounted manner via the advance elements, and the advance elements act on the other part in a driving manner via the contact locations. With the other group the part which lies opposite the advance elements is formed as a resonator so that the movement of the resonator acts in a driving manner via the contact locations.

The piezoelectric motor according to the invention on account of its suitable properties may for example be used for devices concerning measurement technology, optical apparatus, measuring instruments or tachometers etc.

The invention claimed is:

1. A piezoelectric motor comprising a stator and a runner which form a gap, as well as comprising a piezoelectric transducer which is connected to the stator or the runner and which with the stator or the runner forms a resonator, wherein the resonator may be excited in a main oscillation direction, characterized in that the stator comprises an engagement surface facing the runner, or the runner an engagement surface which faces the stator, and that the stator or the runner comprises an elastic advance element which bridges the gap between the stator and the runner in a manner such that a tip of the advance element at least temporarily lies on the engagement surface and said advance element comprises a first part-section as well as a second part-section, the first part-section being connected to the stator or the runner, the second part-section being connected to the first part-section at a bend of the advance element, and the second part-section ending with the tip of the advance element, wherein the part-sections have a different resonant frequency.

2. The piezoelectric motor according to claim 1, characterized in that this is designed as a linear motor, that the resonator has a movement direction which runs perpendicularly to the main oscillation direction, and that the engagement surface runs in the movement direction.

3. The piezoelectric motor according to claim 2, characterized in that the stator is designed running in a linear manner, that the resonator is formed plate-like, and that the resonator is mounted in a linearly movable manner with respect to the stator.

4. The piezoelectric motor according to claim 2, characterized in that the piezoelectric transducer with the stator forms the resonator.

5. The piezoelectric motor according to claim 4, characterized in that the runner is mounted in a linearly movable manner with resjpect to the stator and comprising at least one advance element.

6. The piezoelectric motor according to claim 4, characterized in that the stator has an H-shaped cross section which forms two channels, wh runner is mounted in a linearly movable manner in a first channel, and one or more piezoelectric transducers are arranged in a second channel.

7. The piezoelectric motor according to claim 4 characterized in that the stator has a U-shaped cross section which forms a channel, wherein the runner is mounted in this channel in a linearly movable manner, and one or more piezoelectric transducers are attached on a base part of the U-profile.

8. The piezoelectric motor according to claim 1, characterized in that this is designed as a rotation motor, with a circular runner formed as a rotor, wherein the main oscillation direction of the resonator is directed radially to the rotation centre of the runner, and the engagement surface runs in a circular manner.

9. The piezoelectric motor according to claim 3, characterized in that the stator is designed in an annular manner, the piezoelectric transducer is rigidly connected to the stator, and the main oscillation direction runs radially to the centre of curvature of the stator.

10. The piezoelectric motor according to claim 1, characterized in that the advance element is designed running in a straight line.

11. The piezoelectric motor according to claim 1, characterized in that the advance element is part of the stator or of the runner.

12. The piezoelectric motor according to claim 1, characterized in that the advance element comprises an inclination angle with respect to the main oscillation direction, which is between 45 degrees and more than 0 degrees.

13. The piezoelectric motor according to claim 1, characterized in that a multitude of advance elements are arranged successively one after another on the stator or runner.

14. The piezoelectric motor according to claim 1, characterized in that the first part-section and the second part-section meet at a sharp-bend location, and that the first part-section runs at an angle to the main oscillation direction and that the second part-section runs opposite to the first part-section at an angle to the main oscillation direction.

15. The piezoelectric motor according to claim 14, characterized in that the first part-section as well as the second part-section are designed in a manner such that they have a different resonant frequency.

16. The piezoelectric motor according to claim 1, characterized in that the resonator is designed in a manner such that the stator or runner is arranged in the middle and on each side of the same one piezoelectric transducer each is arranged.

17. The piezoelectric motor according to claim 1, characterized in that the resonator is designed in a manner such that the piezoelectric transducer is arranged in the middle and on both sides in each case a stator or a runner is arranged.

18. The piezoelectric motor according to claim 1, characterized in that the runner is designed as an outer runner.

19. The piezoelectric motor according to claim 1, characterized in that the runner is mounted at a bearing location.

20. The use of a piezoelectric motor according to claim 1, for time-measurement-technology devices, photographic apparatus, measurement instruments or tachometers.

21. A method for driving a piezoelectric motor comprising a stator as well as a runner, wherein the stator or the runner is excited piezoelectrically into an oscillation with a main oscillation direction, characterized in that the stator comprises an engagement surface which faces the runner, or the runner an engagement surface which faces the stator, that the stator or the runner comprises an advance element a tip of which is directed towards the engagement surface, that the advance element comprises a first part-section as well as a second part-section, that the first part-section runs at an angle to the main oscillation direction, that the second part-section runs at an angle to the main oscillation direction and opposite to the first part-section, the first part-section being connected to the stator or the runner, the second part-section being connected to the first part-section at a bend of the advance element, and the second part-section ending with the tip of the advance element, that the first and the second part-section have a different resonant frequency, that the advance element, on account of the oscillation is brought into active connection with the engagement surface in a manner such that the runner is moved with respect to the stator, and that the runner with respect to the stator is moved in the one direction or in the direction opposite to this depending of the frequency of the engaging oscillation.

22. The use of a piezoelectric motor according to claim 21, time-measurement-technology devices, photographic apparatus, measurement instruments or tachometers.

23. A method for use with a piezoelectric motor comprising a stator and a runner which form a gap, as well as comprising a piezoelectric transducer which is connected to the stator or the runner and which with the stator or the runner forms a resonator, wherein the resonator may be excited in a main oscillation direction, characterized in that the stator comprises an engagement surface facing the runner, or the runner an engagement surface which faces the stator, and that the stator or the runner comprises an elastic advance element which bridges the gap between the stator and the runner in a manner such that a tip of the advance element at least temporarily lies on the engagement surface and said advance element comprises a first part-section as well as a second part-section, the first part-section being connected to the stator or the runner, the second part-section being connected to the first part-section at a bend of the advance element, and the second part-section ending with the tip of the advance element, wherein the part-sections have a different resonant frequency, the method comprising the step of causing the piezoelectric transducer to oscillate, and wherein the advance element on account of the oscillation is brought into active connection with the engagement surface in a manner such that the runner is moved with respect to the stator, and that the runner with respect to the stator is moved in the one direction or in the direction opposite to this depending of the frequency of the oscillation.

* * * * *